Sept. 21, 1948.                R. E. E. JESSOP                2,449,654
                                SHAFT COUPLING
Filed Dec. 21, 1943                                        2 Sheets-Sheet 2

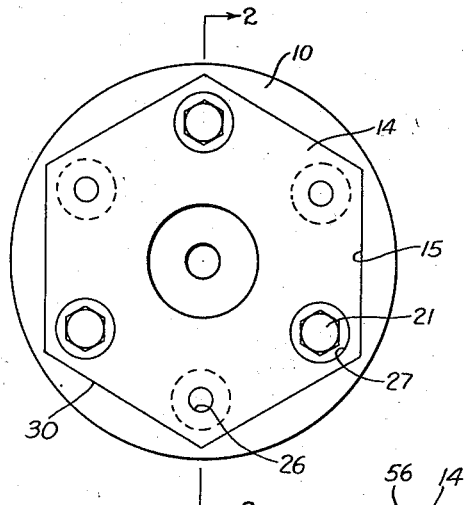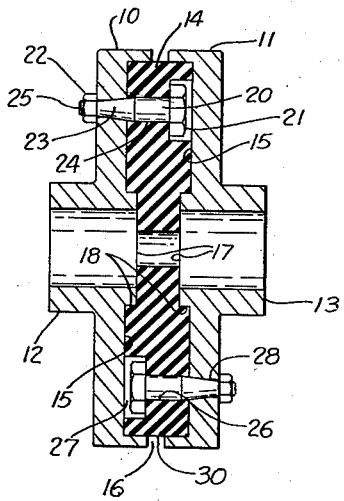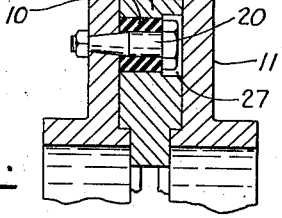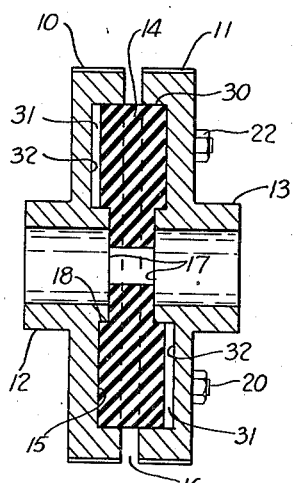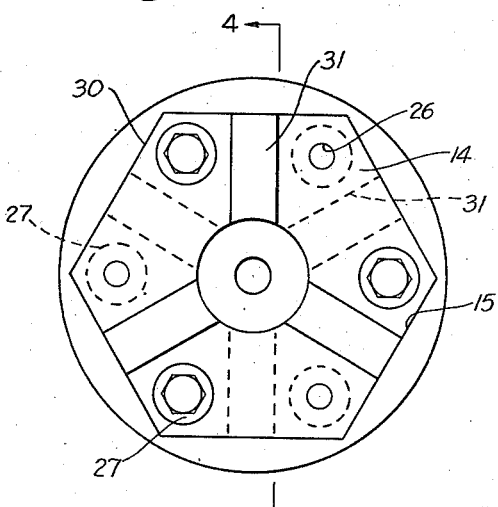

INVENTOR
Robert Edison Edouard Jessop
BY: Featherstonhaugh & Co
ATTORNEYS

Patented Sept. 21, 1948

2,449,654

UNITED STATES PATENT OFFICE 2,449,654

SHAFT COUPLING

Robert Edison Edouard Jessop, West Vancouver, British Columbia, Canada

Application December 21, 1943, Serial No. 515,159
In Canada December 23, 1942

3 Claims. (Cl. 64—13)

This invention relates to improvements in shaft couplings particularly for marine use, but which, if desired, may be used for other purposes.

An object of the present invention is the provision of a flexible shaft coupling which permits the shafts to rotate in either direction without coming apart.

Another object is the provision of a shaft coupling that absorbs or dampens thrust, torque, shock, sound and vibration.

Another object is the provision of a flexible shaft coupling adapted to take care of any reasonable amount of shaft misalignment without damage.

A further object is the provision of a resilient shaft coupling capable of creating a brisk circulation of air around itself.

A further object is the provision of a flexible shaft coupling which will permit a limited longitudinal movement of the shaft relative to each other.

A still further object is the provision of a resilient pad adapted to fit between two flanges and having a relatively large driving connection therewith.

Yet another object is the provision of a device of the nature described which is self-centering and easily assembled.

Still another object is the provision of a shaft coupling which acts as an electrical insulator between the connected shafts.

With these and other objects in view the present invention consists essentially of a shaft coupling comprising a pad adapted to fit between two flanges, means for connecting the pad to one flange, and means for connecting said pad to the other flange, each connecting means being free from the opposite flange, as more fully described and illustrated by way of example in the following specification and accompanying drawings, in which—

Figure 9:
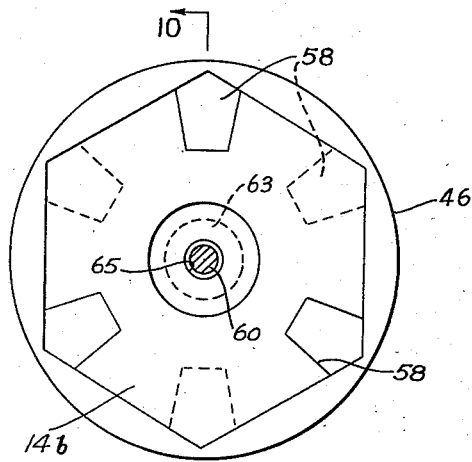
Figure 10:
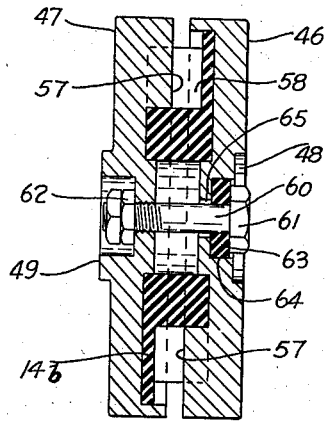
Figure 5:
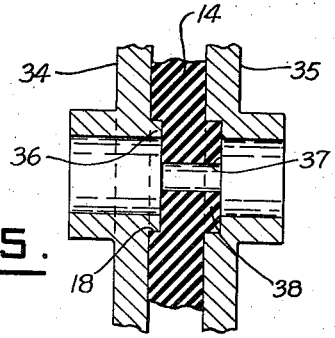
Figure 7:
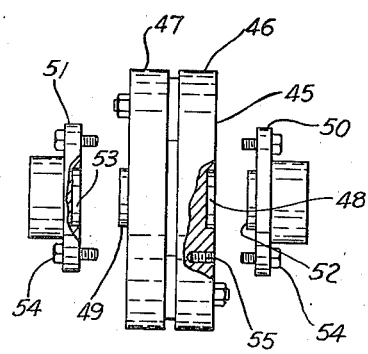
Figure 6:
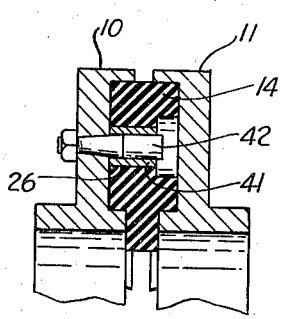

Figure 1 is a face elevation of a pad in place in a flange,

Figure 2 is a sectional view through an assembled coupling, taken on the line 2—2 of Figure 1, Figure 3 is a view similar to Figure 1 of an alternative pad, Figure 4 is a sectional view through an assembled coupling, taken on the line 4—4 of Figure 3, Figure 5 is a reduced fragmentary sectional view of an alternative form of coupling, Figure 6 is a fragmentary sectional view of another alternative coupling, Figure 7 is a reduced side elevation of still another alternative coupling with some parts ready to be assembled, Figure 8 is a fragmentary sectional view of a further variation of the invention, Figure 9 is a view similar to Figure 1 of a still further variation of the invention, and Figure 10 is a sectional view through an assembled coupling, taken on the line 10—10 of Figure 9.

Referring to Figures 1 and 2, 10 and 11 are flanges of any shape, usually circular, having central collars 12 and 13, respectively, projecting outwardly from their outer surfaces, said collars being adapted to receive the ends of shafts (not shown) which are to be connected together. A pad 14, located between these flanges, is preferably formed of rubber, rubber composition or fabricated compositions, but it may be formed of any suitable resilient material, such as leather, felt, plastic, metal, wood or the like, as long as it has the required resiliency, strength and durability.

The pad 14 may be any desired shape, but it preferably is in the form of a polygon having three or more sides, or it may be oval, ovate, or any other design with curved sides, in fact, it may even be round. In the drawings, the pad has been illustrated as a hexagon which is considered a very good shape for this purpose. The pad 14 is any required thickness, although it usually is fairly thin in relation to its other dimensions, as shown, and its opposite faces are substantially parallel to each other.

The pad is placed between the flanges 10 and 11 and the inner faces of the latter may be flush, but it is preferable to form a recess 15 in each of said inner faces the same size and shape as the pad, see Figure 1. The larger the pad in relation to the flanges, the more satisfactory are the results obtained from its use. The pad fits snugly into the recesses 15 of the flanges and the former is of such thickness that a space 16 is left between the adjacent inner surfaces of the flanges. Said flanges are preferably formed with central aligning bosses 17 projecting inwardly from their inner surfaces into corresponding recesses 18 formed in the opposite surfaces of the pad centrally thereof.

Suitable means is provided for connecting the pad to the flanges. The most desirable method of doing this is by means of a plurality of bolts 20, each having a relatively large head 21 on one end and a nut 22 threaded on its opposite end. These bolts may be straight or they may be formed with tapers 23 between the shanks 24 and the threaded sections 25 thereof. The bolts 20 extend through orifices 26 extending through the pad adjacent its periphery, some of said bolts projecting outwardly from one side and some from the opposite side. Each bolt is preferably reversed in relation to the adjacent bolts, and in this case, the bolts alternately project from opposite sides. The heads 21 fit in recesses 27 formed in the surface of the pad at the orifices 26. There is only one recess 27 for each orifice, and some of these recesses are located on one side of the pad and some on the other, depending upon the arrangement of the bolts. The depth of a recess 27 is greater than the thickness of the head 21 therein so that the outer surface of the head is well below the surface of the pad. The bolts 20 extend through holes 28 in the flanges 10 or 11, depending on which side of the pad each bolt projects from. If the bolts are formed with tapers 23, the holes 28 are correspondingly tapered so that said tapers seat themselves in the holes when the nuts 22 are tightened.

With this arrangement, some of the bolts 20 connect the pads 14 to the flange 10, while the other bolts connect said pad to the flange 11. It will be noted that, since the heads of the bolts are counter-sunk in the recesses 27, the bolts are free from the opposite flange to the one to which they are secured.

When the form of the invention of Figures 1 and 2 is assembled, the flanges 10 and 11 are connected together by means of the pad 14 and the bolts 20, but the flanges do not come into contact with each other. Actually, neither flange comes into contact with any metal which is secured to the other flange. The bosses 17 by fitting into the recesses 18 help to line up the various parts as soon as they are brought together. When one bolt is driven through its orifice 26 and the corresponding hole 28, the remaining orifices and holes are fairly well lined up. If the bolts are formed with the tapers 23, these assist in lining up the parts as the bolts are pulled home by the nuts 22. The diameters of the bolts are preferably slightly greater than the diameters of the orifices 26 in order that the material of the pad grips the bolts. The tapers of the bolts tend to bind in the tapered holes 28, thus preventing the bolts from turning when the nuts are tightened to compress the pad between the flanges. The comparatively long peripheral surface 30 of the pad provides a large driving surface between said pad and the flanges. The shape of the pad in all cases but when it is circular, prevents said pad from turning in the recesses 15.

In Figures 3 and 4, the pad 14 is formed with one or more ribs 31 on its opposite surfaces each fitting into a corresponding groove 32 formed in the inner surface of the adjacent flange. These ribs may alternate on the opposite sides, as shown, or they may not if this is not desired. These ribs provide an increased driving surface between the pad and the flange, as well as strengthening the former.

Figure 5 shows a pair of ordinary coupling flanges 34 and 35 in place of the flanges 10 and 11. The flange 34 has the usual central boss 36 received in recess 18 formed in one surface of pad 14 and this flange 34 corresponds to flange 10 shown in Figure 2. Flange 35 differs from flange 11 shown in Figure 2 in that it is provided with a recess 37 adapted to receive a boss 38 formed on the surface of the pad 14 opposite to the recess 18 and boss 36. The bosses 36 and 38 are alined and they centre the flanges. This arrangement may be used with flanges without the recesses 15, or the boss 36 and the recess 37 may be formed at the bottom of the recess 15 of their respective flanges.

Figure 6 illustrates an alternative which may be used with either of the above-mentioned alternatives. In this case, a bushing 41 is driven into each orifice 26 and pins 42 are substituted for the bolts 20. These pins are the same shape as the bolts, but the heads 21 are omitted. The pins may be straight or tapered, the same as the bolts. If desired, the recesses 27 may be omitted from the form of the invention. This arrangement allows relative longitudinal movement of the shafts connected together by the flanges, since the pins 42 permit the flanges to move towards and away from each other while still maintaining a driving connection therebetween. These pins are not long enough to come into contact with the opposite flange.

Figure 7 shows an alternative which may incorporate any of the features of the other forms of the invention. This figure shows a unit constructed according to this invention which may be used in connection with ordinary shaft couplings already in use. This alternative includes a unit 45 having flanges 46 and 47 in place of the flanges 10 and 11. The flanges 46 and 47 are not provided with collars 12 and 13, but the former has a central recess 48 and the latter a central boss 49 projecting outwardly therefrom. The remainder of the construction of the unit is the same as that of any of the figures previously described. Ordinary coupling flanges 50 and 51 have the usual boss 52 and corresponding recess 53, respectively. When the unit 45 is placed between these flanges the bosses 49 and 52 fit into the respective recesses 53 and 48 to line up the parts. The usual bolts 54 extend through the flanges and are threaded into sockets 55 formed in the outer surface of the flanges 46 and 47.

In the alternative of Figure 8 a pad 14a similar to the pad 14 may be formed of hard or stiff material, such as metal or wood. A bushing 56 formed of rubber, rubber composition or any other suitable resilient material, is inserted in each orifice 26. The bolts 20 extend through these bushings, as shown, or pins 42 may be used in place of the bolts. In the latter case, it is advisable to have a metal bushing 41 placed inside each bushing 56. These resilient bushings preferably are larger in diameter than the bolt heads so that the latter rest on the former.

The unit 45 may be used in connection with coupling flanges already in use. The unit is large enough to permit the outer ends of the bolts 20 or pins 42 and the nuts thereof to clear the peripheries of the flanges, while the recess 48 and boss 49 are made to receive and fit into, respectively, the boss 52 and recess 53. If desired, the unit may be made smaller, and the flange peripheries notched to receive the bolt or pin ends and the nuts, or the threaded portions of the bolts may be made sufficiently long to extend through holes drilled in the flanges and their nuts threaded thereon outside said flanges.

In the form of the invention illustrated in Figures 9 and 10, the flanges 46 and 47 are formed with one or more ribs 57 which fit snugly into corresponding recesses 58 formed in each face of a pad 14b similar to the pad 14 adjacent the periphery thereof. These recesses may alternate on the opposite faces, as shown, or they may extend entirely across from one side to the other in which case the ribs 57 of the flanges 46 and 47 could extend part way into each recess, the space 16, however, still remaining. In this variation the bolts 20 and pins 42 may be entirely omitted, and a bolt 60 provided having a relatively large head 61 on one end and lock nuts 62 threaded on its opposite end. A washer or pad 63, of similar material to the pad 14b, fits snugly into a recess 64 formed in the centre of the flange 46, said recess having a hole 65 somewhat larger in diameter than the shanks of the bolts.

The bolt 60 fits snugly through the washer 63, its head against the outer face of the washer, and is threaded into the opposite flange 47, the lock nuts 62 being provided to prevent the bolt from turning.

With this arrangement the entire torque is taken in either direction of the rotation through the ribs 57 against the sides of the recesses 58, the centre bolt being provided simply to hold the unit together.

It is obvious that the flanges 10 and 11 of Figures 1 and 2 could be used in the alternatives of Figures 9 and 10 in place of the flanges 46 and 47, in which case the former flanges would have ribs 57 on their inner surfaces.

In another variation, the bolts or pins may be entirely omitted. In this case, the shape of the pad 14 provides the only driving connection. The flanges would necessarily have the recesses 15 formed therein and the pad could not be circular in shape. In the latter alternative, the pad may be bonded to either or both flanges.

With a rubber or rubber composition pad, the torque is transmitted through the rubber from face to face. In the event of overload, since the rubber is more or less a fluid and since it is confined within the recesses 15 of the coupling, it cannot lose its shape, but it tends to become a solid. The greater the load, the harder the rubber becomes so that it cannot turn in its recesses. This also applies to other of the softer materials when used in the pad, that is, the more load there is, the less likely the pad is to lose its shape and turn within the recesses. In other words, the efficiency of the coupling increases with the load.

In the alternative of Figure 8, the bushings 56 act as a cushion or pad. Some of these bushings are connected to the flange 10 and others to the flange 11 so that the flanges are able to move relative to each other.

This shaft coupling is particularly useful in places where the connected shafts are not in perfect alignment or may become temporarily or permanently out of alignment during the use, or are subjected to casual or constant shocks. The resiliency of the pad 14 permits the shafts to be temporarily or permanently out of alignment without causing any damage or interfering with the efficiency of the coupling. The bosses and the corresponding recesses of the flanges or pads make the coupling self-centering and very easy to assemble. The taper of the bolts or pins also aids in centering the various elements. The pad also absorbs or dampens thrust, torque, shock, vibration and sound. The degree to which the pad acts in this manner depends upon the material of the pad. A pad formed of rubber, rubber composition, some plastics, leather, felt, or the like, as long as they are of the required resiliency, strength and durability, functions very well for the purpose of this invention, and even wood may be used, although the latter is not very good for misaligned shafts. The absorption and dampening quality of the coupling depend not only on the pad, but also on the fact that the bolts or pins used as the connecting means are free of or do not come into contact with the flange opposite to the one to which they are connected. For this same reason, the coupling acts as an electrical insulator between the shafts if the pad is formed of non-conducting material. Furthermore, the shafts may be turned in either direction without danger of the coupling coming apart, since some of the bolts always tend to tighten regardless of the direction of rotation. In marine use, the coupling takes care of the thrust in reverse when the propeller pulls astern.

By having a pad of polygonal or curved shape (other than circular) the periphery thereof becomes a large driving surface which takes some of the strain off the bolts, pins or other connecting means without undue strain on any particular portion of the pad. In other words, the strain is evenly distributed throughout the pad. When the pad is other than circular in shape, the edge thereof at the space 16 acts as a fan and creates a brisk circulation of air therearound, thus keeping the coupling comparatively cool.

When the pins 42 are employed, the flanges are not fixedly connected to each other so that the shafts are free to move within reasonable limits longitudinally in relation to each other. This is particularly useful when coupling the drive shaft of an electrical motor to another shaft, since there is usually a certain amount of longitudinal movement of the former shaft.

What I claim as my invention is:

1. A shaft coupling comprising a pair of flanges, a recess formed in the inner surface of each flange, each recess having at least three sides, a correspondingly shaped resilient pad adapted to fit snugly into said recesses, a plurality of recesses formed in the opposite faces of the pad, said recesses extending part way through the pad, ribs formed in the flange recesses fitting snugly into the pad recesses, a bolt extending freely through one flange and removably secured to the other, and a resilient washer between the bolt and the flange through which it freely extends, said bolt resiliently retaining the flanges and pad together.

2. A shaft coupling comprising a pair of flanges, a recess formed in the inner surface of each flange, each recess having at least three sides, a correspondingly shaped resilient pad adapted to fit snugly into said recesses, a plurality of recesses formed in the opposite faces of the pad, said recesses extending part way through the pad, ribs formed in the flange recesses fitting snugly into the pad recesses, one flange having a hole centrally thereof, a bolt extending freely through the hole of said flange and removably secured to the other flange, and a resilient washer between the bolt head and the holed flange, said bolt resiliently retaining the flanges and pad together.

3. A shaft coupling comprising a pair of flanges, a recess formed in the inner surface of each flange, each recess having at least three sides, a correspondingly shaped resilient pad adapted to fit snugly into said recesses, a plurality of recesses formed in the opposite faces of the pad, said recesses extending part way through the pad and opening outwardly at its periphery, and the recesses in one face being staggered in relation to those of the other face, ribs formed in the flange recesses fitting snugly into the pad recesses, one flange having a hole centrally thereof, a bolt extending freely through the hole of said flange and removably secured to the other flange, and a resilient washer between the bolt head and the holed flange, said bolt resiliently retaining the flanges and pad together.

ROBERT EDISON EDOUARD JESSOP.

(References on following page)

REFERENCES CITED

The following references are of record in the file of this patent:

UNITED STATES PATENTS

| Number | Name | Date |
|---|---|---|
| 1,310,845 | Simms | July 22, 1919 |
| 1,396,979 | Thomas | Nov. 15, 1921 |
| 1,417,432 | Walker | May 23, 1922 |
| 1,646,427 | Skidmore | Oct. 25, 1927 |
| 1,651,671 | Carrey | Dec. 6, 1927 |
| 1,698,160 | Hall | Jan. 8, 1929 |
| 1,646,427 | Clark | Oct. 25, 1927 |
| 1,911,846 | Queen | May 30, 1933 |
| 2,079,460 | Marty | May 4, 1937 |
| 2,096,597 | Seabrooks | Oct. 19, 1937 |
| 2,105,702 | Scholtze | Jan. 18, 1938 |
| 2,146,764 | Ricefield | Feb. 14, 1939 |
| 2,200,641 | Ricefield | May 14, 1940 |
| 2,220,622 | Homer | Nov. 5, 1940 |
| 2,290,421 | FitzGerald | July 21, 1942 |

FOREIGN PATENTS

| Number | Country | Date |
|---|---|---|
| 446,033 | Great Britain | Apr. 23, 1936 |